US007618701B2

(12) United States Patent
Zhou

(10) Patent No.: US 7,618,701 B2
(45) Date of Patent: Nov. 17, 2009

(54) POROUS PIGMENT COATING

(75) Inventor: Xiao-Qi Zhou, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 736 days.

(21) Appl. No.: 11/195,522

(22) Filed: Aug. 1, 2005

(65) Prior Publication Data

US 2007/0026206 A1 Feb. 1, 2007

(51) Int. Cl.
*B32B 5/16* (2006.01)

(52) U.S. Cl. ................. 428/206; 428/195.1; 428/211.1; 428/217; 428/219; 428/220; 428/325; 428/327; 428/342; 428/364; 428/368; 428/688

(58) Field of Classification Search .............. 428/195.1, 428/206, 211.1, 217, 219, 220, 325, 327, 428/342, 364, 368, 688
See application file for complete search history.

(56) References Cited

U.S. PATENT DOCUMENTS 2,022,004 A * 11/1935 Larson .................... 162/164.7
3,239,371 A 3/1966 Whitney et al.
5,131,951 A 7/1992 Yoshida et al.
5,141,988 A 8/1992 Suwala et al.
5,770,303 A 6/1998 Weinert et al.
6,280,831 B1 8/2001 Nakanishi et al.
6,485,826 B1 11/2002 Watanabe et al.
6,777,075 B2 8/2004 Concannon et al.
2002/0006985 A1 1/2002 Sau
2002/0182382 A1 12/2002 Hirabayashi et al.
2002/0187333 A1 12/2002 Gu
2003/0106658 A1* 6/2003 Ilmonen et al. ............. 162/135
2003/0180641 A1 9/2003 Nakajima et al.
2004/0001963 A1 1/2004 Watanabe et al.
2004/0229063 A1 11/2004 Concannon et al.
2005/0130053 A1* 6/2005 Ishiyama et al. ......... 430/108.8
2005/0181185 A1* 8/2005 Zhou et al. ............... 428/195.1

FOREIGN PATENT DOCUMENTS

EP 0471486 A2 2/1992
EP 0701179 B1 3/1996
EP 1284436 A1 2/2003
JP 05-241366 A 9/1993
JP 406025996 A 2/1994
JP 406280195 A 10/1994
JP 11-160906 A 6/1999
JP 2000-226791 A 8/2000
WO WO 02/25013 A1 * 3/2002
WO WO-03/083213 A1 10/2003
WO 2004018769 A1 3/2004
WO 2004060650 A1 7/2004

* cited by examiner

*Primary Examiner*—Betelhem Shewareged

(57) ABSTRACT

In one aspect of the present system and method, an electrophotographic media includes a porous base media and a bi-modal pigmented composition disposed on the porous media that provides an increased resistance to blistering during pigment fusing. The bi-modal pigment may include a first pigment and a second pigment, the first pigment including particles having acicular morphology, and the second pigment including substantially spherical particles.

24 Claims, 4 Drawing Sheets

POROUS PIGMENT COATING

BACKGROUND

With the rapid development of digital image technology, traditional monochromatic electrophotographic printing is gradually being replaced by full color, high image quality electrophotographic printing. Electrophotographic printing technology enables the making of good quality in-house prints on-demand without requiring professional skills such as those skills used to perform conventional offset printing (lithographic printing) in a printing house.

The print quality of full color electrophotographic printing operations has traditionally been limited by characteristics of the print media. To enhance the image effect in color electrophotographic printing, a coated print media such as paper is often used. Traditional coated print media are coated with pigment compositions and other functional materials configured to promote toner transfer. Additionally, traditional print media coatings and processes are used to enhance the gloss and surface smoothness of the uncoated print media. For the coated print media, a calendaring procedure is often used to apply pressure to the media to achieve high gloss and surface smoothness.

However, the dense pigmented coating used to coat traditional print media creates a situation known as blistering. One of the latter steps of electrophotographic imaging is to permanently fix toner particles on the media surface by applying thermal energy to thermal plastic based toner particles. During this image fusing procedure, moisture in the print media is vaporized due to the local application of high thermal energy by the fusing roller. When the water vapor cannot be discharged from the print media smoothly, it rapidly expands inside the print media and often causes a local delamination of print media layers.

Additionally, the above-mentioned calendaring process increases the density of the coating layer and makes the blistering phenomenon more prominent. Furthermore, advanced electrophotographic printing devices include double headed fuser rollers which apply thermal energy to both sides of the print media during processing at a higher temperature and slower passing speed to increase toner gloss. These processing conditions tend to worsen the anti-blister performance of print media.

SUMMARY

In one aspect of the present system and method, an electrophotographic media includes a porous base stock and a bi-modal pigmented coating disposed on the porous base stock.

BRIEF DESCRIPTION OF THE DRAWINGS

The accompanying drawing illustrates various embodiments of the present system and method and is a part of the specification. The illustrated embodiments are merely examples of the present system and method and do not limit the scope thereof.

Throughout the drawings, identical reference numbers designate similar, but not necessarily identical, elements.

DETAILED DESCRIPTION

Figure 1:
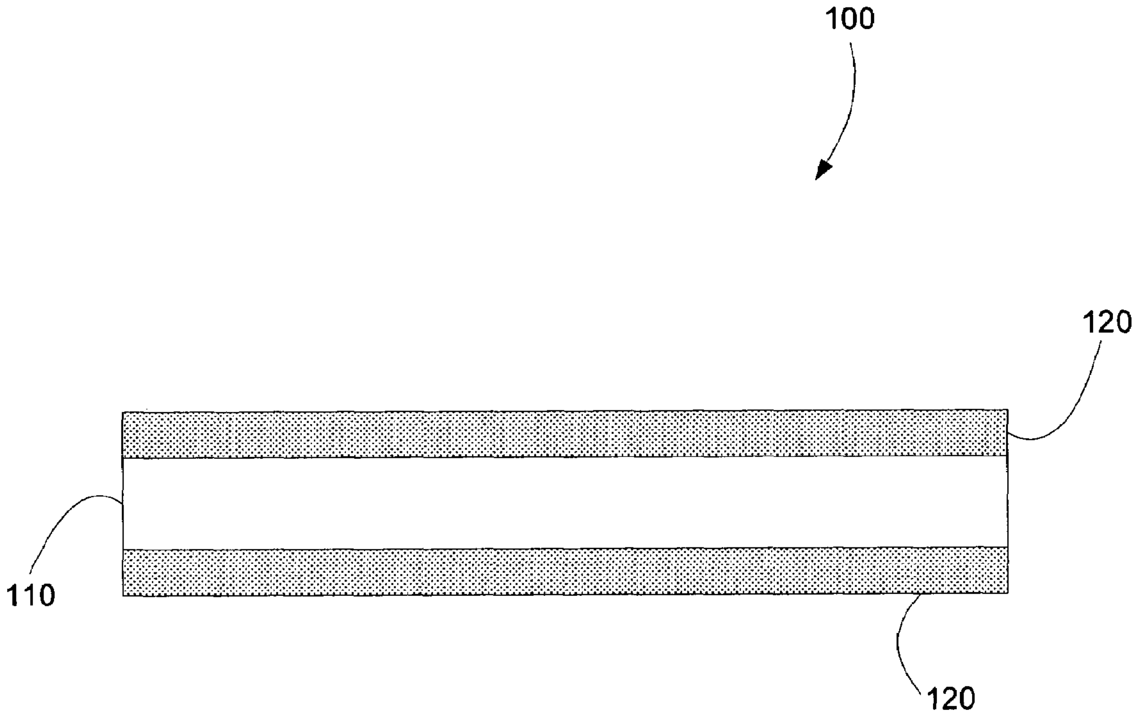
FIG. 1 is a cross-sectional view of a print media, according to one exemplary embodiment.

The present specification discloses an exemplary media coating composition that enables color electrophotographic printing with good blister resistance. More specifically, the present system and method provides a porous pigment coating that allows moisture present in a print media to be easily released during toner fixation, thereby avoiding localized blisters. According to one exemplary embodiment, the porous coating composition includes coating layer(s) made of a pigment with bi-model particle distribution and a fabric base paper stock. Further details of the present media coating composition and methods for using thereof will be provided below.

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof.

As used in the present specification and in the appended claims, the term "electrophotographic printing" is meant to be understood broadly as including any number of methods that use light to produce a change in electrostatic charge distribution to form a photographic image including, but in no way limited to, laser printing.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In the following description, for purposes of explanation, numerous specific details are set forth in order to provide a thorough understanding of the present system and method for forming a media coating composition that enables color electrophotographic printing with good blister resistance. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

FIG. 1 illustrates a cross-sectional view of an electrophotographic media (100) according to one exemplary embodiment. As illustrated in FIG. 1, the exemplary electrophotographic media (100) includes at least two components: a base media (110) and a pigment coating (120) disposed on the base media (110). According to the present exemplary embodiment, the anti-blister performance of the electrophotographic media (100) is attributed, at least in part, to the fiber adhesion or internal bonding strength of the base media (110) and the porosity of both the base media and the pigment coating layers (120). The base media (110) and the pigment coating (120) will now be described in further detail below.

As shown in FIG. 1, the base media (110) forms the base of the electrophotographic media. The present exemplary electrophotographic media will be described herein, for ease of explanation only, in the context of a paper stock base media. However, it will be understood by one of ordinary skill in the art that any number of base media materials may be used by the present system and method including, but in no way limited to, paper base, pigmented paper base, cast-coated paper base, foils, and films.

According to the present exemplary embodiment, the paper stock base media (110) is porous, has an internal bonding strength of between approximately 170-500 J/m$^2$, and has a basis weight of between approximately 60-250 gram/m$^2$ (gsm), but preferably in the range of 65-170 gsm. If the paper stock base media (110) has a basis weight over approximately 250 gsm, it may act as a thermal sink to absorb the local flow of thermal energy during toner fixation. More specifically, when a plurality of paper stock base media have the same internal bonding strength, the thinner the paper caliper or the lighter the paper weight, the stronger the local thermal energy applied on the media. Therefore the thinner paper is more easily blistered due to moisture evaporation under the higher thermal energy. Conversely, if the paper stock base media (110) has a basis weight of greater than approximately 250 gsm, blistering is less of a concern, but heat applied to toner disposed on the paper stock will be significantly reduced due to absorption of thermal energy by the thicker base paper, often resulting in poor image quality due to poor toner adhesion and low toner gloss.

Any number of wood and non-wood pulps may be used to form the present stock base media (110), according to one exemplary embodiment. For example, ground wood pulp, sulfite pulp, chemically ground pulp, refiner ground pulp, thermomechanical pulp, or mixtures thereof may be used to form the stock base media (110). Additionally, any number of fiber lengths may be used to form the stock base media. However, according to one exemplary embodiment, the percentage of long fiber pulp is relatively high in the pulp composition to further enhance blister resistance.

Additionally, a number of fillers may be included in the above-mentioned pulps during formation of the stock base media (110). According to one exemplary embodiment, the fillers that may be incorporated into the pulp to control physical properties of the final coated paper include, but are in no way limited to, ground calcium carbonate, precipitated calcium carbonate, titanium dioxide, kaolin clay, and silicates. As incorporated in the present exemplary system and method, the amount of fillers may vary widely. However, according to one exemplary embodiment, the fillers represent from approximately 0 to 20% by weight of the stock base media (110). According to another exemplary embodiment, the filler represents from between approximately 5 to 15% by weight of the stock base media (110).

Additionally, internal sizing may be performed during the preparation of the base paper stock (110), according to one exemplary embodiment. Accordingly, the internal sizing processing not only provides improved internal bond strength to the fibers but also controls the resistance of the resulting stock base media (110) to wetting penetration and absorption of moisture which causes blister at elevated temperature. Examples of appropriate sizing agents that may be included into the present stock base media (110) include, but are in no way limited to, rosin-based sizing agents, wax-based sizing agents, synthetic sizing agents, cellulose-reactive sizing agents, and/or neutral sizing agents.

Surface sizing of the base paper stock (110) aids in determining the integrated strength and stiffness of the base stock. However, the application of a surface sizing press will generally reduce the porosity of the base paper stock, thereby reducing the anti-blister performance of the base paper stock (110) during toner fusing. Consequently, according to one exemplary embodiment, the Gurley porosity of the present exemplary base paper stock (110) is controlled in the range of approximately 25-100 seconds to ensure blister free performance. Internal bonding strength of the base paper stock (110) enhances anti-blister performance. More specifically, during toner fusing processing, water vapor can rapidly diffuse out of the strong and open fibrous layer of the stock base media (110) to the pigment coating layer (120). If, however, the internal bonding strength of the exemplary base paper stock (110) is not sufficiently strong (i.e. low fiber adhesion), the fibrous layers of the base paper stock cannot resist the pressure generated by expanding water vapor in a "closed" base paper stock because the closed structure will prevent water vapor from diffusing through the fibrous layer of the base paper stock. According to one exemplary embodiment, the final internal bonding strength of the base media (110) is between approximately 170-500 J/m$^2$.

Continuing with FIG. 1, the base media (110) is covered by a pigment coating (120). According to the present exemplary embodiment, the pigment coating (120) substantially determines the porosity of the electrophotographic media (100). According to one exemplary embodiment of the present system and method, one or more pigment coating layers can be applied on one or both sides of the base media (110) to create a desired surface property. More specifically, according to one exemplary embodiment, the gloss, the opacity, and the smoothness of the electrophotographic media (100) may be varied through the application of the pigment coating (120). If a high gloss, high opacity, smoother electrophotographic media (100) is desired, a two layer pigment coating may be desired on each side of the base paper media (110).

According to one exemplary embodiment, the pigment coating (120) includes, but is in no way limited to, a number of inorganic pigments. The blister performance of the resulting electrophotographic media (100) may be determined, at least in part, by the packing density of the pigment particles, the packing density being to the particle size, particle size distribution and morphology of the particles. According to the present exemplary embodiment, any kind of inorganic pigments may be used to form the pigment coating (120) on the base media (110) including, but in no way limited to, pigments in the form of a dry powder or slurry that is based on calcium carbonate chemistry. Pigments based on calcium carbonate chemistry may be used, according to one exemplary embodiment, due to the ability of calcium carbonate pigment to supply increased brightness, opacity, smoothness, and gloss when compared to other traditional inorganic pigments.

The pigments based on calcium carbonate used to form the present exemplary pigment coating (120) may be obtained using any kind of traditional manufacturing methods. According to one exemplary embodiment, calcium carbonate is divided into natural ground calcium carbonate (GCC) and chemical precipitated calcium carbonate (PCC) through traditional manufacturing methods. Depending upon the distinct arrangement of the calcium, carbon, and oxygen atoms forming the calcium carbonate in the crystal structure, the calcium carbonate can assume three different crystal structures: calcite, aragonite, and/or an unstable vaterite crystal. The calcite crystal form of the calcium carbonate may assume any one of four different shapes: rhombohedral, scalenohedral, prismatic and spherical. Further, the aragonite crystal form of calcium carbonate assumes discrete or clustered needle-like shapes.

According to one exemplary embodiment, the present porous pigment coating (120) is formed on the base media (110) by incorporating a calcium carbonate pigment having discrete acicular morphology and a certain aspect ratio. According to one exemplary embodiment, the aspect ratio of the acicular or needle-like aragonite particles in the pigment coating (120) may be defined as:

$$An=l/d \qquad \text{Equation 1}$$

Where An is the aspect ratio of need-like particles in the pigment coating (120), l is the average length of calcium carbonate particles and d is average width of the particles. According to the present exemplary embodiment, the average length of the calcium carbonate particles (l) is much greater than their average width (d). More specifically, it was found that the packing density of the needle-like pigments is determined by the degree of "needle" separation, the pigments with higher aspect ratio having a greater irregularity and giving a looser packing structure.

To create a porous pigment coating layer (120) without sacrificing other properties, the aspect ratio (An) is between approximately 50 and 300, with a preferable range being between approximately 70 and 180. According to this exemplary embodiment, the particle size of the calcium carbonate based pigments ranges from approximately 0.1-0.8 micrometers. According to another exemplary embodiment, the calcium carbonate based pigments rage in size from approximately 0.2 to 0.5 micrometers. Further, according to one exemplary embodiment, a narrow particle size distribution (PSD) is beneficial where:

$$PSD=(D85/D15)^{1/2} \qquad \text{Equation 2}$$

Wherein "D85" is meant to be understood as the particle size in micrometers at which approximately 85 percent of the particles in the calcium carbonate based pigments by size are smaller, according to a distribution curve. Similarly, the term "D15" is meant to be understood as the particle size in micrometers at which approximately 15 percent of the particles by size are smaller, according to a size distribution curve.

According to one exemplary embodiment, the PSD range of particles used in the porous pigment coating layer (120) is between approximately 1.2 and 1.8. The increase in porosity is substantially consistent throughout the pigment coating layer (120), resulting in a reduction in the surface finish in micro-scale when compared to traditional print media. The reduced smoothness in surface finish caused by the coating porosity subsequently impacts the image quality when a high resolution photo image is formed on the media. The rough surface finish can be ironed in subsequent super calendaring processing through the application of a higher temperature and line pressure. However, the more severe conditions adopted in a super calendaring process will inevitably further close the open structure in the coating.

According to one exemplary embodiment, to compensate for the rough surface resulting from the porous structure, a small amount of plastic pigments such as latex based on polystyrene chemistry is added to the present pigment coating (120). According to this exemplary embodiment, a smooth surface may be maintained without damaging the open structure of the pigment coating by controlling the particle size of the plastic pigment. According to the present exemplary embodiment, if the particle size of the plastic pigments is greater than approximately 2-3 micrometer, the plastic pigment particles will help to enhance the surface smoothness and the gloss of the electrophotographic media (100) significantly but will dramatically reduced the overall porosity. Consequently, the present exemplary pigment coating applies plastic pigment particles having particle sizes close to that of the acicular aragonite particles. More specifically, according to one exemplary embodiment, the plastic pigment particles may range from approximately 0.2 to 0.5 microns and in an amount of approximately 0.5 to 5 parts by weight based on 100 parts of inorganic pigments. According to this exemplary embodiment, the electrophotographic media (100) not only maintains a porous structure, but also exhibit a higher gloss of 75-85% as tested at 75 degrees, and results in a very good photo quality image.

As mentioned above, the "open" porous structure prevents blistering of the electrophotographic media (100) during fixation of the toner. However, the pigment used to make the open structure of the illustrated electrophotographic media (100) also creates rheological challenges for the coating processing. More specifically, when a coating composition that includes pigment having a discrete acicular morphology is formed on an electrophotographic media (100), or similarly, when a multi-layer pigment coating (120) includes a coating composition with discrete acicular calcium carbonate as the base layer coating color, liquid "lubricants" such as water in the coating composition will rapidly drain into the base media (110) and/or base coating layer, subsequently increasing the viscosity of the pigment coating. An increase in the viscosity of the pigment coating (120) may result in a formation or buildup of a substantially hard cake pigment on a metering device such as a blade. Consequently, when the metering device is passed over the surface of the pigmented coating (120), undesirable visible scratches may be left on the coating surface.

While it is generally known that some higher molecule polymers such as the polyacrylate salts, CMC, or starch can be added to a coating composition to improve water retention, the addition of the higher molecule polymers would also thicken the viscosity of the system, effectively nullifying the beneficial effects of the open porous structure. Alternatively, to keep the viscosity of the system in a workable range with the above-mentioned polymer loaded coating formulations, the solid content may be reduced. However, a reduction in solid content will produce a negative effect on gloss development.

To address the above processing and performance issues, the present system and method incorporate a pigment coating layer (120) that includes mixed pigments having a bi-model distribution. According to the present exemplary embodiment, the term "bi-modal" is meant to be understood as a pigment coating mixture that when plotting the weight fraction of the particles against particle size demonstrates two distinct peaks. According to this exemplary embodiment, the bi-modal pigment coating layer (120) includes a first pigment in the form of needle-like aragonite crystals of calcium carbonate and a second pigment in the form of any type of inorganic or organic pigments. However, according to one exemplary embodiment, the second pigment is an inorganic pigment with a round-like or substantially spherical morphology, for example, substantially round ground calcium carbonate. To maintain appropriate porosity in the bi-modal pigment coating layer (120), according to one exemplary embodiment, the particle size of the second or substantially round pigment may range from approximately 1.5 to 3.0 times the particle size of the mean average particle size (APS) of the first pigment in the form of needle-like aragonite crystals of calcium carbonate. Additionally, the particle size distribution of both the first and second pigments should be relatively small; giving the particle size distribution spectrum two distinct peaks. Additionally, according to one exemplary embodiment, the overlap of the distribution tails should be kept at a minimum. According to one exemplary embodiment, the ratio of first to second pigment may range between 100 parts acicular aragonite crystals to between approximately 10-80 parts second or substantially round pigment. According to another exemplary embodiment, the ratio of first to second pigment may range between 100 parts acicular aragonite crystals to approximately 20-50 parts second or substantially round pigment. Additionally, as mentioned previously, a small amount of plastic pigments such as latex based on polystyrene chemistry may also be added to the bi-modal pigment coating layer (120) to compensate for the rough surface resulting from the porous structure.

As illustrated in FIG. 1, the base media (110) may be coated with one or more layers of the present bi-modal pigment coating layer (120), depending on the desired final properties. According to one exemplary embodiment, a multilayer coating structure may be implemented to produce the better sheet formation, higher gloss uniformity and smoother surface often desired for high end photo image quality printing. According to this exemplary embodiment, the outermost layer of a multilayered coating has the greatest impact on the physical properties of the resulting media such as surface smoothness and gloss level. Generally, discrete needle-like PCC pigment can provide, after super-calendaring under a mild condition, high brightness, high light scattering or opacity, and a high gloss level of 75-85% as tested at 75 degrees by TAPPI method. Additionally, the physical properties of the resulting media may be modified to produce a "soft gloss" appearance, i.e., gloss level at 40-50%, by varying the pigment ratio. Essentially any desired gloss level may be established while maintaining the blister resistant qualities of the present media through variation of the pigment ratio, since substantially round calcium carbonate generally contributes a lower gloss level than discrete acicular calcium carbonate pigment.

Exemplary Formation Method

Figure 2:
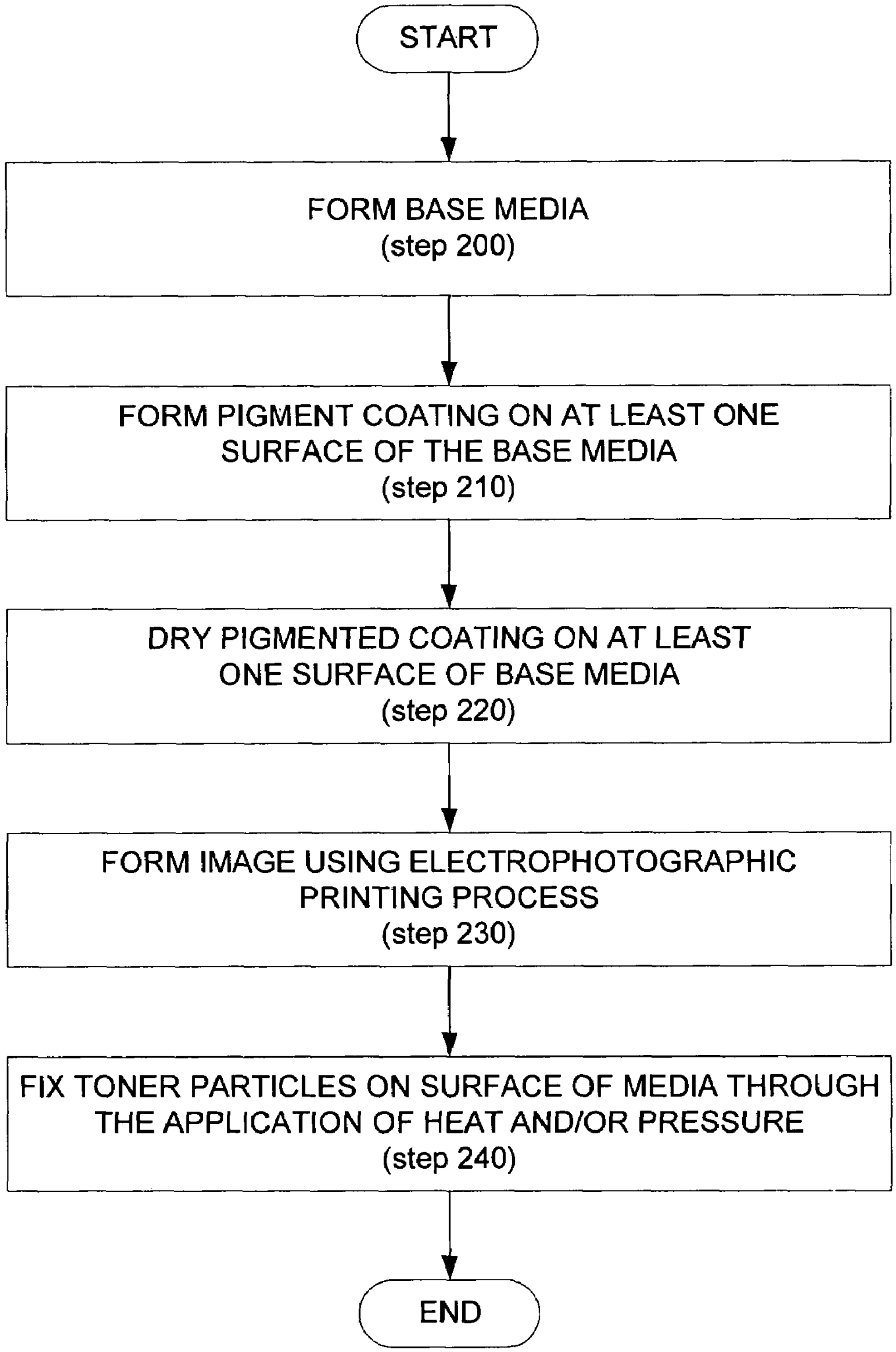
FIG. 2 is a flow chart illustrating a method for forming a blister resistive print media, according to one exemplary embodiment.

FIG. 2 illustrates an exemplary method for forming and printing on an electrophotographic media (100) according to one exemplary embodiment. As illustrated in FIG. 2, the exemplary method begins by first, forming the base media (step 200). Once the base media is formed, the above-mentioned pigment coating layer(s) is formed on at least one surface of the base media (step 210). With the pigment coating formed on at least one surface of the base media, the pigment coating is dried (step 220) and super-calendared. An image may be formed using an electrophotographic printing process (step 230). With toner particles transferred from a development device in a pattern of desired image on the electrophotographic media, the toner particles may then be melted and fixed to the surface of the electrophotographic media through the application of heat and/or pressure (step 240). The independent steps of the above-mentioned method will now be described in further detail below.

As shown in FIG. 2, the first step of the present exemplary method is to form the base media (step 200). As mentioned previously, the base media (100; FIG. 1) of the present exemplary embodiment is porous and has a basis weight of between approximately 60-250 gram/m$^2$ (gsm) and an internal bonding strength of between approximately 170 and 500 kJ/m. According to one exemplary embodiment, the Gurley porosity of the present exemplary base paper stock (110) is controlled in the range of approximately 25-100 seconds.

Any number of wood and non-wood pulps may be used to form the present stock base media (110), according to one exemplary embodiment. For example, ground wood pulp, sulfite pulp, chemically ground pulp, refiner ground pulp, thermomechanical pulp, or mixtures thereof may be used to form the stock base media (110). Additionally, any number of fiber lengths may be used to form the stock base media. However, according to one exemplary embodiment, the percentage of long fiber pulp is relatively high in pulp composition. Moreover, as mentioned previously, a number of fillers and/or sizing agents may also be included in the present stock based media as mentioned above.

Once the base media is formed, the above-mentioned pigmented base layer(s) and/or top image receiving layer(s) can be applied to one or more sides of the base media (step 210). Both pigmented base and/or top layers can be applied to the base media using an on-machine or off-machine coater. Examples of suitable coating techniques include, but are not limited to, slotting die coaters, roller coaters, fountain curtain coaters, blade coaters, rod coaters, air knife coaters, gravure application, air brush application and other techniques and apparatuses known to those skilled in the art.

Figure 3:
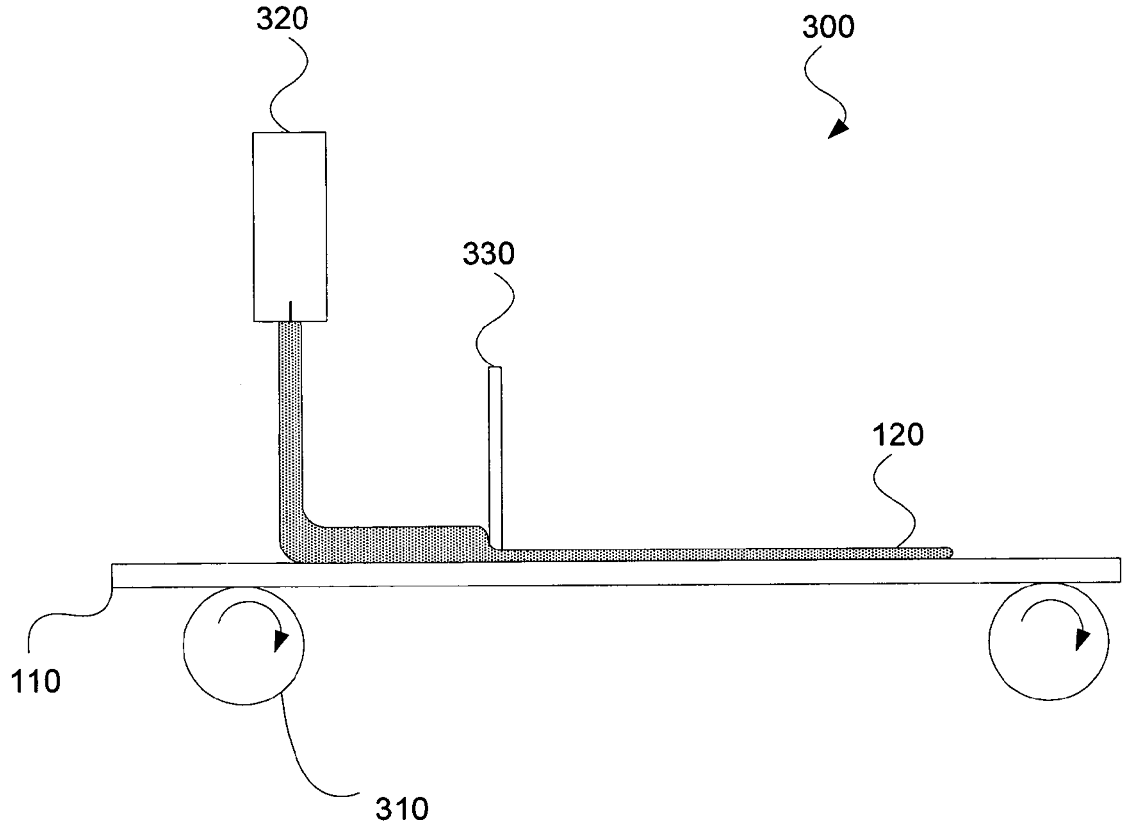
FIG. 3 is a cross-sectional side-view of a print media formation apparatus, according to one exemplary embodiment.

FIG. 3 illustrates a knife coating apparatus (300) according to one exemplary embodiment. As illustrated in FIG. 3, base media (110) may be translated adjacent to a material dispenser (320) by a number of transport rollers (310), belts, or other translating device. As the base media (110) is passed adjacent to the material dispenser (320), material forming the pigment coating (120) is dispensed from the material dispenser by gravity or under pressure. As illustrated, the material forming the pigment coating (120) then coats the base media (110). As the base media (110) having the pigment coating (120) thereon is further translated by the transport rollers (310), it is passed under a knife (330) that scrapes off any extra pigment coating (120). According to this exemplary embodiment, the speed of the rollers (310) or other translating device, as well as the gap between the knife (330) and the base media (1100 may be selectively varied to modify the thickness of the pigment coating (120) on the base media (110).

According to one exemplary embodiment, a single layer of pigment coating (120) may be formed on the base media (110). Alternatively multiple layers including a base layer and top layers of pigment coating (120) may be formed in the base media (110) to achieve a desired coating. Consequently, the base layers and the top layers may be applied singly or simultaneously, with a coating weight of about 5 to 30 g/m$^2$ for the respective base and top layers. In one exemplary embodiment, the coating weight of each layer of pigment coating is between approximately 8 to 15 g/m$^2$ for each of the base and top layers. The solids content of the respective compositions that make up the base and top layers can range from about 50 wt % to 80 wt %, with a viscosity of approximately 200 cps to 2500 cps as measured using a low shear Brookfield viscometer at a speed of 100 rpm. When measured at a higher shear rate of about 6000 rpm and using a high shear Hercules viscometer, the viscosity of the aforementioned compositions is about 30 cps to 70 cps. Once applied, the layers may be dried by convection, conduction, infrared radiation, or other known methods (step 220). After coating the recording media with the base composition and/or the image receiving composition, a calendaring process can be used to achieve desired gloss or surface smoothness. The calendaring device can be a separate super-calendaring machine, an on-line soft nip calendaring unit, an off-line soft nip calendaring machine, or the like.

Figure 4:
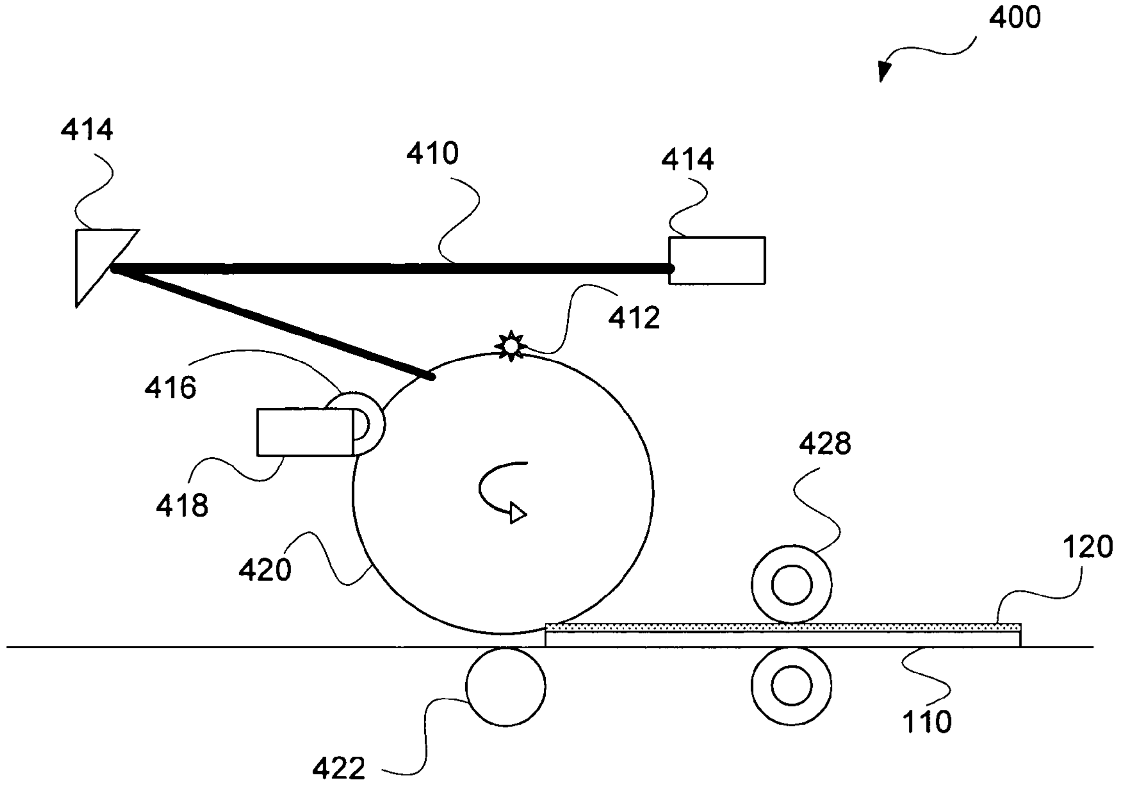
FIG. 4 is a simple block diagram illustrating an electrophotographic printing system, according to one exemplary embodiment.

With the pigment coating (120) dried onto the base media (110) and calendared, an image may be formed thereon through an electrophotographic printing process (step 230). FIG. 4 illustrates an electrophotographic printing apparatus (400) that may be used to form an electrophotographic image according to one exemplary embodiment. As illustrated in FIG. 4, a modulated laser (410), through an optical system (414), may write a latent image as a field of charges applied to a photoelectric drum (420) by a corona charging device (412). This image is developed with toner from a development device (416, 418). The charges in the toner cause it to adhere to the latent image on the drum (420). The toner image is then transferred directly from the drum (420) to the pigment coating layer (120) formed on top of the base media (110), or through a transfer roller (422).

Returning to FIG. 2, once the toner particles are formed on top of the base media (110), the toner may then be fixed to the pigment coating layer (120) formed on top of the base media through the application of heat and/or pressure (step 240). According to one exemplary embodiment, as illustrated in FIG. 4, the selectively transferred toner that is placed on the pigment coating layer (120) is fixed thereto by a number of heated fuser rollers (428). Traditionally, the fixation of the toner to the pigment coating layer (120) would frequently result in the above-mentioned blistering of the print media caused by vaporization of moisture therein, especially printing in the higher humidity condition such as over 70% relative humidity. However, the present electrophotographic media (100; FIG. 1) prevents blistering due to the ready release of vaporized moisture, even in severe high humidity conditions such as 30° C. and 80% relative humidity. As mentioned above, the present electrophotographic media (100; FIG. 1) prevents blistering, at least in part, due to its bi-modal pigment coating, the internal bonding strength of the base media (110), and the open structure of the base paper.

EXAMPLES

According to one exemplary embodiment, formulation ranges for the components of an exemplary pigment coating layer is illustrated below in Table 1:

TABLE 1

| Chemicals | Function | Amount (parts by weight) |
|---|---|---|
| Aragonite calcium carbonate slurry | main pigment | 70-95 |
| Spherical calcium carbonate slurry | 2nd pigment | 5-30 |
| Poly(styrene-butadiene) latex | binder | 5-15 |
| Polyvinyl alcohol | co-binder | 0.1-1 |
| Electrolytes (salt mixture) | electrical-decay control | 1-8 |
| Plastic pigment | image quality control | 0.5-5 |
| Optical brighter | brightness enhancement | 0.5-2 |
| Organic dye | shade adjustment | 0.0001-0.05 |
| Polyacrylate salt | thickener | 0.1-0.5 |

According to the exemplary embodiment illustrated in Table 1, the pigment coating is formed on a base paper with an 82.5 gsm weight, an internal bonding strength of 368 J/m$^2$, and a Gurley porosity of 45 seconds. A number of exemplary formulation ranges were prepared and applied to a base media. These prepared base media were then evaluated for blister performance in examples one through eight below. In the following examples, the unit "parts" is measured by weight, unless otherwise specified.

Example 1

A coating pigment was prepared according to following formulation:

TABLE 2

| Component | Parts |
|---|---|
| ACC (Aragonite calcium carbonate slurry) | 85 pts |
| CCC (Calcite calcium carbonate slurry) | 15 pts |
| Poly(styrene-butadiene) latex | 10 pts |
| Polyvinyl alcohol | 0.6 pts |
| Electrolytes (salt mixture) | 4.5 pts |
| Polystyrene latex (particle size 0.35μ) | 2 pts |
| Polyacrylate salt | 0.3 pts |

The solids content of the coating color composition can range from 60 wt % to 75 wt %, with a viscosity of 1000 cps to 1500 cps as measured by low shear Brookfield viscometer at a speed of 100 rpm, or 30 cps to 40 cps at a higher shear rate of 6000 rpm using a high shear Hercules viscometer. The coating pigment was applied to a single side of a base stock, though according to one embodiment, the coating pigment is applied to both sides of the base stock using an on-machine or off-machine coater with a coating weight of 5 to 15 g/m$^2$ on each side. Examples of suitable coating techniques including, but are in no way limited to, slotted die application, roller application, fountain curtain application, blade application, rod application, air knife application, gravure application, air brush application, and others known in the arts.

The coating layer was then dried by convection, conduction, infrared radiation, atmospheric exposure, or other known methods. Additionally, a calendaring process can be performed on the coated paper, according to one exemplary embodiment, to achieve a desired gloss or surface smoothness. The calendaring device can be a separate super calendaring machine, an on-line soft nip calendaring unit, an off-line soft nip calendaring machine, or the like.

Examples 2-5

In the examples 2-5, the same coating formulation and processing as illustrated in the example 1 were used on a base paper stock. The base papers used in examples 1-5 had similar composition in filler content and fiber composition, but they differ in bulk and surface sizing and base weight. The details are listed in Table 3 below:

TABLE 3

| | Internal bond strength (J/m$^2$) | Gurley porosity (sec) | Base weight (gsm) |
|---|---|---|---|
| Ex. 1 | 328 | 21 | 83 |
| Ex. 2 | 360 | 49 | 106 |
| Ex. 3 | 374 | 29 | 102 |
| Ex. 4 | 135 | 24 | 112 |
| Ex. 5 | 305 | 17 | 67 |

Example 6

In the sixth example formulation, a base coating color was prepared according to following formulation in Table 4:

TABLE 4

| Component | Parts |
|---|---|
| ACC (Aragonite calcium carbonate slurry) | 55 pts |
| CCC (Calcite calcium carbonate slurry) | 45 pts |
| Poly(styrene-butadiene) latex | 10 pts |
| Polyvinyl alcohol | 0.6 pts |
| Electrolytes (salt mixture) | 5 pts |
| Polystyrene latex (particle size 0.35μ) | 2 pts |
| Polyacrylate salt | 0.3 pts |

Additionally, a top coating color was prepared according to following formulation illustrated in Table 5 below:

TABLE 5

| Component | Parts |
|---|---|
| ACC (Aragonite calcium carbonate slurry) | 85 pts |
| CCC (Calcite calcium carbonate slurry) | 15 pts |
| Poly(styrene-butadiene) latex | 10 pts |
| Polyvinyl alcohol | 0.6 pts |
| Electrolytes (salt mixture) | 3 pts |
| Polystyrene latex (particle size 0.35μ) | 2 pts |
| Polyacrylate salt | 0.3 pts |

According to Example 6, the base coating formulation and top coating formulation were applied on the base paper stock according the method outlined in the Example 1. The base paper stock used in example formulation 6 was identical to that of Example 1.

Example 7

In the seventh exemplary formulation the top coating formulation was the same as that of Example 6 above and the base coating color composition was replaced with the formulation illustrated in, except the base coating color composition was replaced by following formulation illustrated in Table 6 below.

TABLE 6

| Component | Parts |
|---|---|
| SCC (Spherical calcium carbonate slurry) | 100 pts |
| Poly(styrene-butadiene) latex | 10 pts |
| Polyvinyl alcohol | 0.6 pts |
| Electrolytes (salt mixture) | 5 pts |
| Polystyrene latex (particle size 0.35μ) | 2 pts |
| Polyacrylate salt | 0.3 pts |

Additionally, Example 7 above used the same top coating formulation, base paper stock, and processing as Example 6.

Example 8

In Example 8, the bottom coating formulation, the base paper stock, and the processing of Example 6 was used. However, in contrast to Example 6, the top coating formulation includes a plastic latex with comparatively large particle size, as illustrated in Table 7 below:

TABLE 7

| Component | Parts |
|---|---|
| ACC (Aragonite calcium carbonate slurry) | 85 pts |
| CCC (Calcite calcium carbonate slurry) | 15 pts |
| Poly(styrene-butadiene) latex | 10 pts |
| Polyvinyl alcohol | 0.6 pts |
| Electrolytes (salt mixture) | 3 pts |
| Polystyrene latex (particle size 2.8μ) | 2 pts |
| Polyacrylate salt | 0.3 pts |

The exemplary coated paper formulations 1 through 8 above were evaluated for anti-blister performance using a Hewlett-Packard 's color laser printer CLJ-9500 under "heavy gloss paper" fusing model. The printer and tested media were first pre-acclimated in an environmental chamber of with temperature 30° C. and 80% relative humidity. The test pattern was a "dark-blue" image which is a 200% toner (100% cyan toner and 100% yellow toner) coverage pattern across the whole sheets. The tested media were duplex printed with the same pattern on both side. The criteria for evaluation were as follow in Table 8:

TABLE 8

| | |
|---|---|
| Excellent: | There is no any blister or micro-bulge spot shown on the sheets |
| Good: | There is no blister and very few micro-bulge spots on the sheets |
| Average: | There is no blister but had some micro bulge spots on the sheets |
| Bad: | There is at least one blister spot of coating-paper base delaminating, or paper fiber delaminating. |

The results of the evaluation of the examples are summarized in Table 9 below:

TABLE 9

| | Excellent | Good | Average | | Bad |
|---|---|---|---|---|---|
| Ex. 1 | | x | | | |
| Ex. 2 | | | x | --→ | x |
| Ex. 3 | x | | | | |
| Ex. 4 | | | x | | |
| Ex. 5 | | | | | x |
| Ex. 6 | x---→ | x | | | |
| Ex. 7 | | | | | x |
| Ex. 8 | | | x | | |

By using the present exemplary porous pigment coating on a base paper with higher internal bond strength and increased open structure shows blister-free performance (Ex. 1 and Ex. 3), whereas the sample based on both low bonding strength (Ex. 4) and on a "closed" paper (Ex. 2) had poor anti-blister performance. The results of example 5 illustrate that even if the bond strength and porosity of the base paper meet the above-mentioned criteria, with a low base weight, the thermal effect of fusing the pigment to the media will increase causing the paper to blister. Additionally, Examples 6-8 illustrate that the pigment composition having a bi-model particle distribution provides a porous structure that prevents blister while the addition of relatively large plastic latex particles may trigger the blister.

In conclusion, the above-mentioned examples illustrate a number of benefits that may be provided by the present exemplary system and method, according to one exemplary embodiment. More specifically, the disclosed base media and bi-modal pigment coating provides an increased resistance to blistering during pigment fusing.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An electrophotographic media comprising:

a porous base media; and a bi-modal pigmented composition disposed on said porous media, said bi-modal pigmented composition comprising a first pigment and a second pigment, said first pigment having a particle size distribution (PSD) between approximately 1.2 and 1.8 and a length-to-width aspect ratio between 70 and 180.

2. The electrophotographic media of claim 1, wherein said first pigment including particles having acicular morphology; and said second pigment including substantially spherical particles.

3. The electrophotographic media of claim 2, wherein said first pigment comprises calcium carbonate particles.

4. The electrophotographic media of claim 2, wherein said second pigment comprises calcium carbonate particles.

5. The electrophotographic media of claim 2, wherein said first pigment comprises aragonite calcium carbonate.

6. The electrophotographic media of claim 2, wherein said second pigment comprises a calcite calcium carbonate.

7. The electrophotographic media of claim 2, wherein said second pigment comprises a spherical or round-like calcium carbonate.

8. The electrophotographic media of claim 2, wherein said particles having acicular morphology comprise between approximately 0.1 and 0.8 micrometers in size.

9. The electrophotographic media of claim 2, wherein said spherical or round-like particles comprise between approximately 0.1 and 0.8 micrometers in size.

10. The electrophotographic media of claim 2, wherein said particles having acicular morphology and said spherical or round-like particles comprise between approximately 0.2 and 0.5 micrometers in size.

11. The electrophotographic media of claim 2, wherein said bi-modal pigmented composition further comprises a third pigment;

said third pigment including a plastic pigment.

12. The electrophotographic media of claim 11, wherein said plastic pigment comprises a latex based on polystyrene chemistry.

13. The electrophotographic media of claim 11, wherein said plastic pigment comprises plastic pigment particles ranging from approximately 0.2 to 0.5 microns; and wherein said plastic pigment is present in said bi-modal pigmented composition in an amount of approximately 0.5 to 5 parts by weight.

14. The electrophotographic media of claim 2, wherein said bi-modal pigmented composition further comprises one of a binder, an electrical-decay control agent, an image quality control agent, a brightness enhancement agent, a shade adjustment agent, or a thickener.

15. The electrophotographic media of claim 1, wherein said porous base media comprises paper.

16. The electrophotographic media of claim 1, wherein said porous base media comprises an internal binding strength of between approximately 170 and 500 J/m$^2$.

17. The electrophotographic media of claim 1, wherein said porous base media has a basis weight of between approximately 60 and 250 grams/m$^2$.

18. The electrophotographic media of claim 1, wherein said porous base media has a Gurley porosity range of approximately 25-100 seconds.

19. The electrophotographic media of claim 17, wherein said porous base media has a basis weight of between approximately 65 and 170 grams/m$^2$.

20. An electrophotographic media comprising:

a porous base media; and a bi-modal pigment disposed on said porous media:

wherein said bi-modal pigment comprises a first calcium carbonate pigment and a second calcium carbonate pigment, said first pigment including particles having acicular morphology, and said second pigment including spherical particles where in said first calcium carbonate pigment has a particle size distribution (PSD) between approximately 1.2 and 1.8 and a length-to-width aspect ratio between 70 and 180.

21. The electrophotographic media of claim 20, wherein said porous base media comprises paper having an internal binding strength of between approximately 170 and 500 J/m$^2$ and a basis weight of between approximately 60 and 200 grams/m$^2$.

22. The electrophotographic media of claim 21, wherein said porous base media further comprises sizing agents.

23. A means for reducing sensitivity to blistering in an electrophotographic print media comprising:

a means for supporting an image forming particle, said means for supporting having a porous structure, an internal binding strength of between approximately 170 and 500 J/m$^2$, a Gurley porosity range of approximately 25-100 seconds, and a basis weight of between approximately 60 and 200 grams/m$^2$; and a porous means for glossing a surface of said means for supporting an image forming particle, said porous means comprising a first calcium carbonate pigment and a second calcium carbonate pigment, said first pigment including particles having acicular morphology, and said second pigment including spherical particles.

24. The means for reducing sensitivity to blistering of claim 23, wherein said means for supporting an image forming particle comprises a porous base paper.

* * * * *

UNITED STATES PATENT AND TRADEMARK OFFICE

CERTIFICATE OF CORRECTION

PATENT NO. : 7,618,701 B2
APPLICATION NO. : 11/195522
DATED : November 17, 2009
INVENTOR(S) : Xiao-Qi Zhou It is certified that error appears in the above-identified patent and that said Letters Patent is hereby corrected as shown below:

In column 14, line 27, in Claim 20, delete "where in" and insert -- wherein --, therefor.

Signed and Sealed this

Twenty-ninth Day of June, 2010

David J. Kappos
*Director of the United States Patent and Trademark Office*